Figure 1:
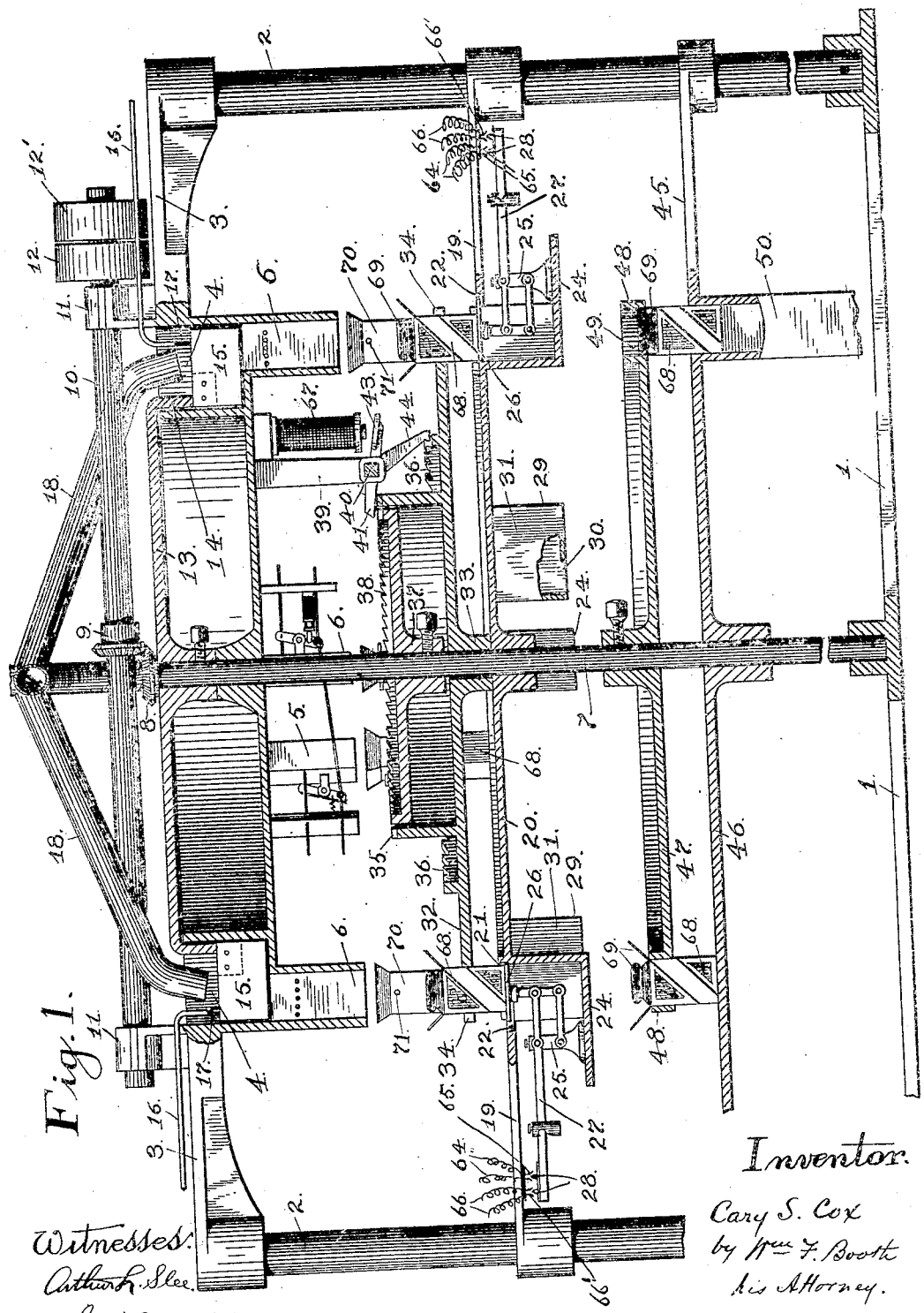

No. 824,412. PATENTED JUNE 26, 1906.
C. S. COX.
FRUIT WEIGHING AND PACKING MACHINE.
APPLICATION FILED OCT. 3, 1905.
5 SHEETS—SHEET 1.

Witnesses:
Arthur L. Slee
J. Compton

Inventor:
Cary S. Cox
by Wm. F. Booth
his Attorney.

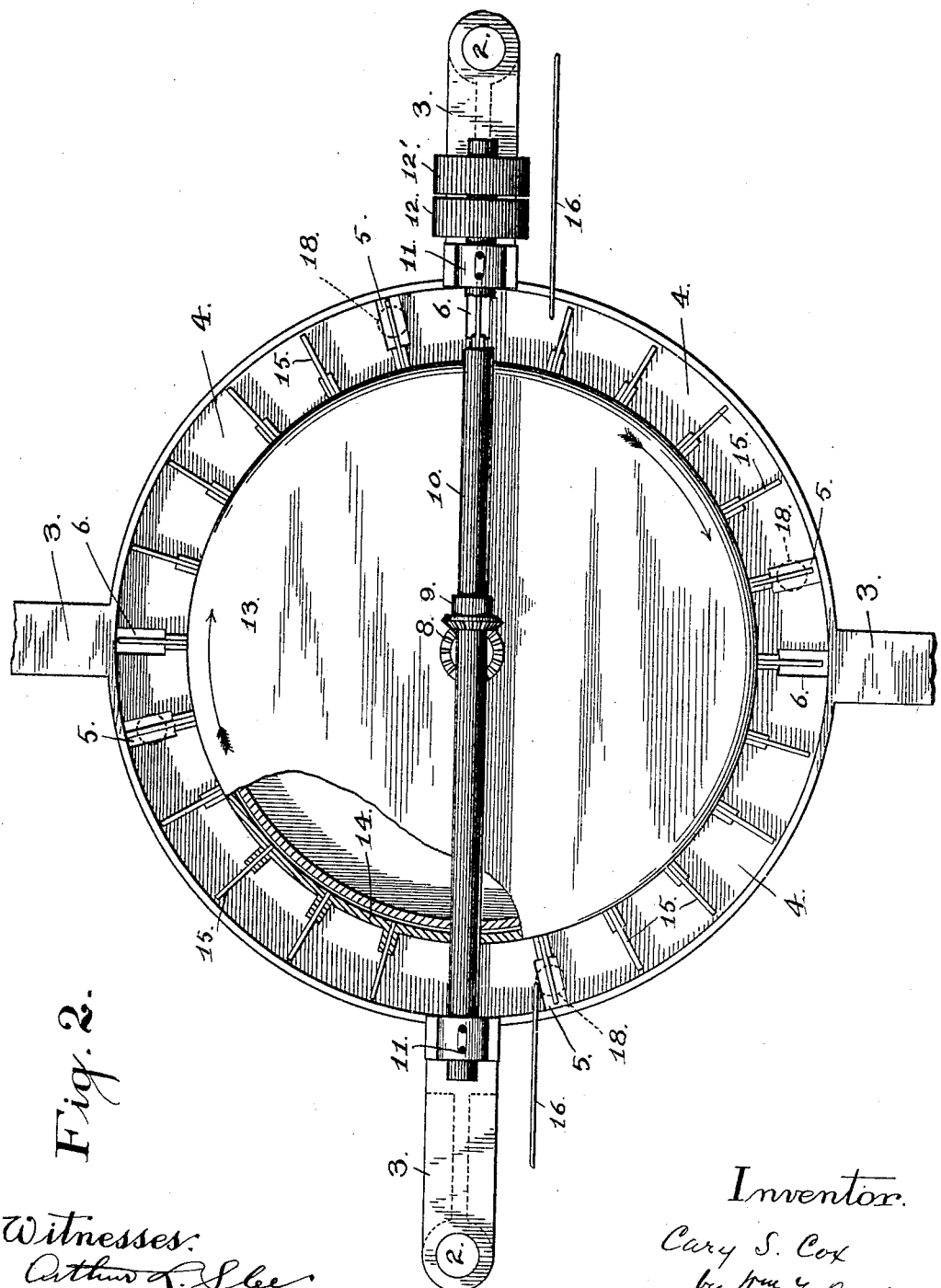

No. 824,412. PATENTED JUNE 26, 1906.
C. S. COX.
FRUIT WEIGHING AND PACKING MACHINE.
APPLICATION FILED OCT. 3, 1905.
5 SHEETS—SHEET 3.
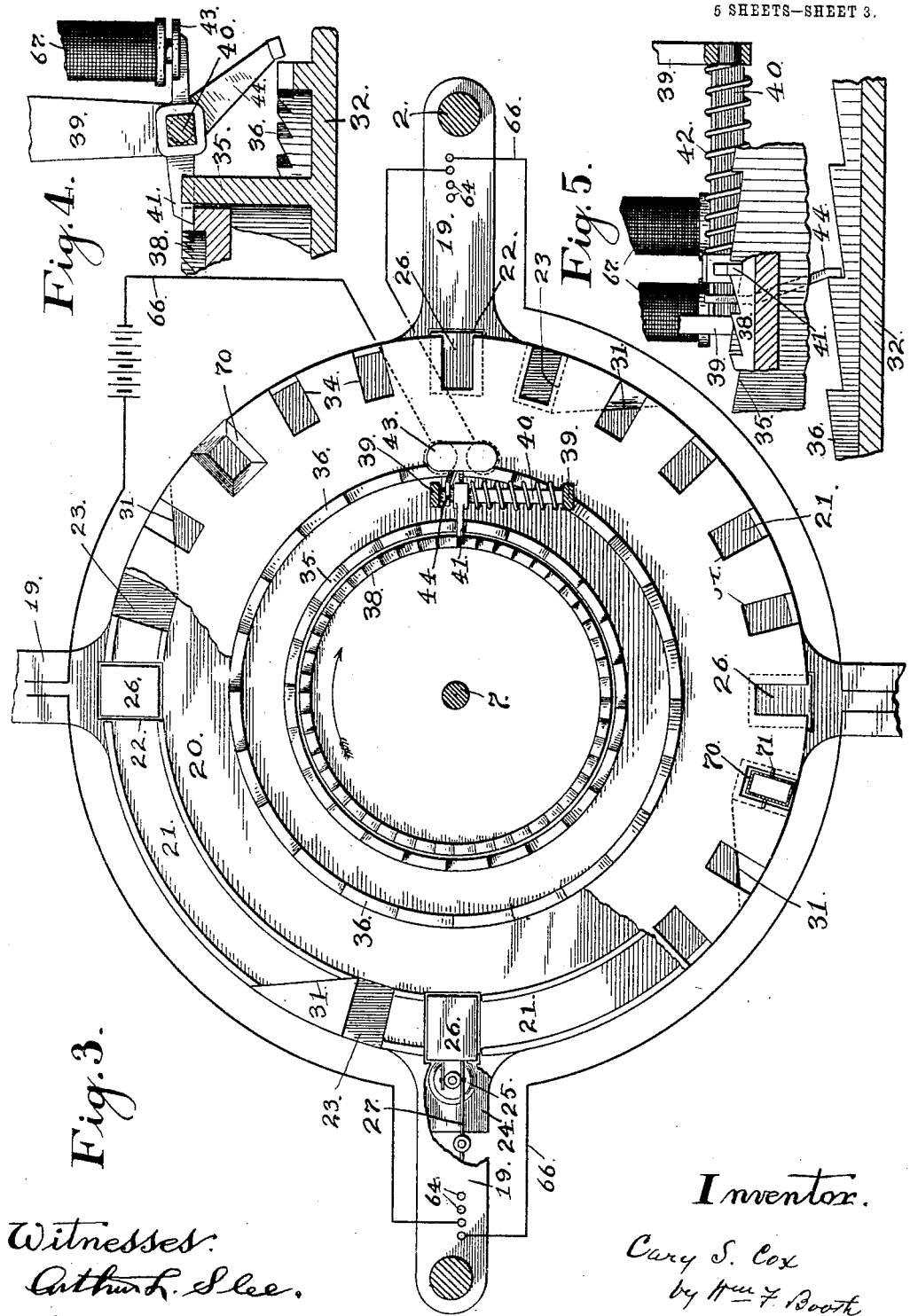

No. 824,412. PATENTED JUNE 26, 1906.
C. S. COX.
FRUIT WEIGHING AND PACKING MACHINE.
APPLICATION FILED OCT. 3, 1905.
5 SHEETS—SHEET 4.
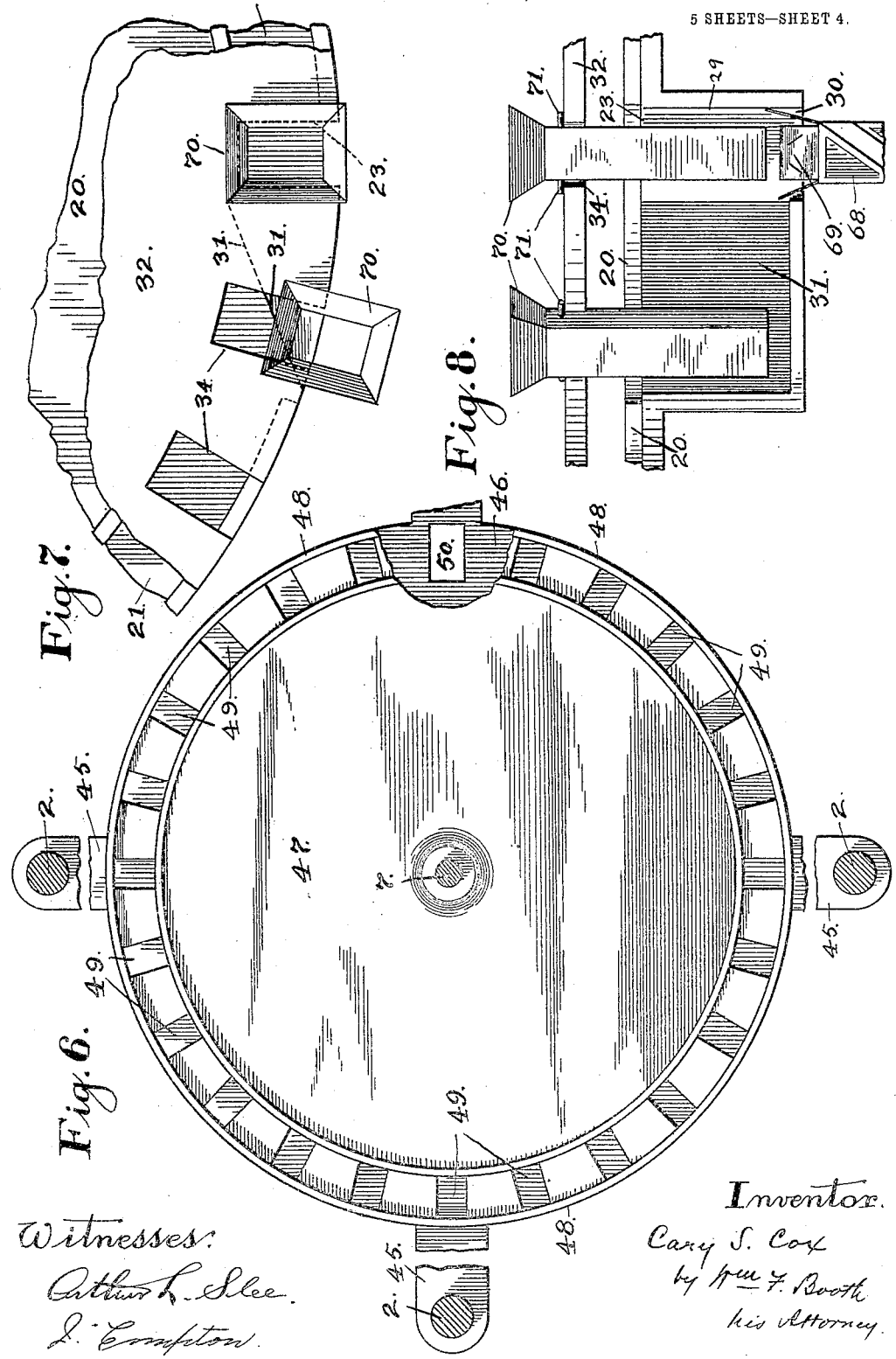

No. 824,412. PATENTED JUNE 26, 1906.
C. S. COX.
FRUIT WEIGHING AND PACKING MACHINE.
APPLICATION FILED OCT. 3, 1905.
5 SHEETS—SHEET 5.
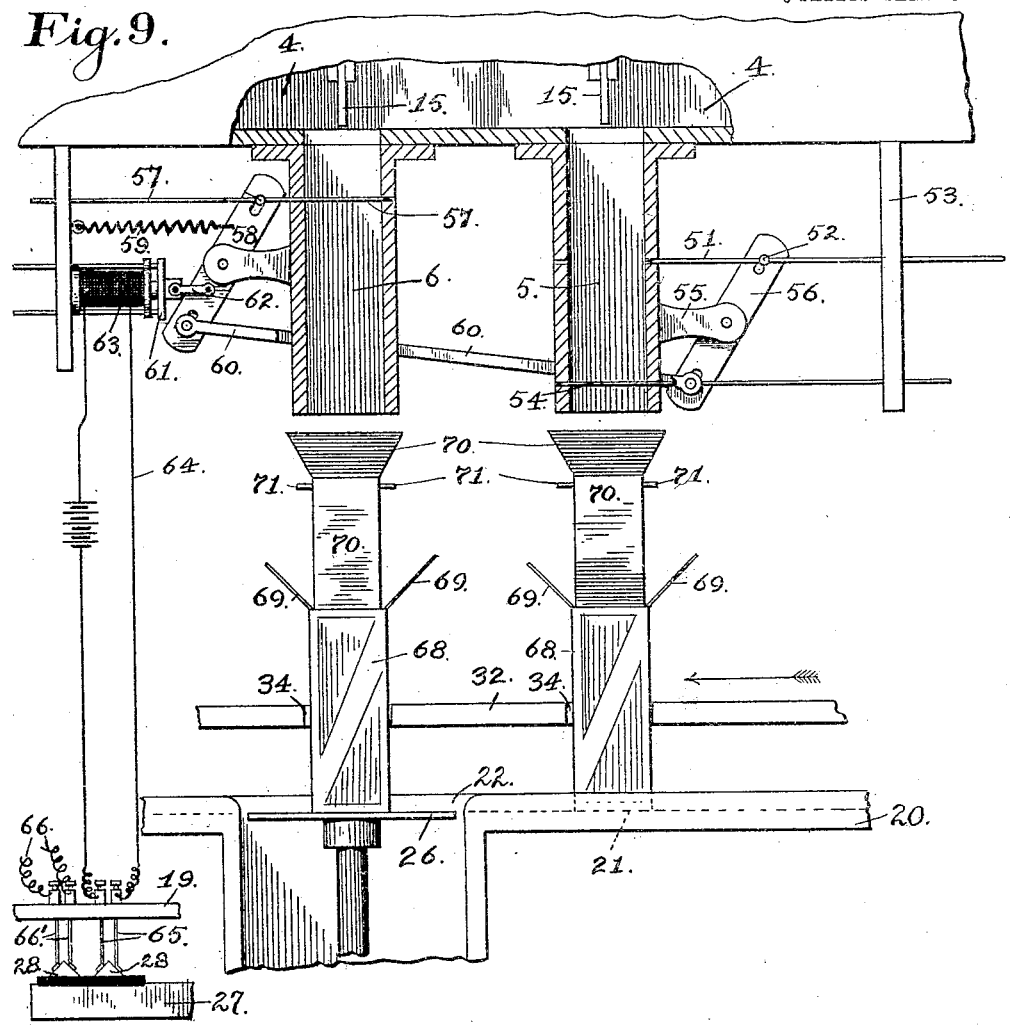
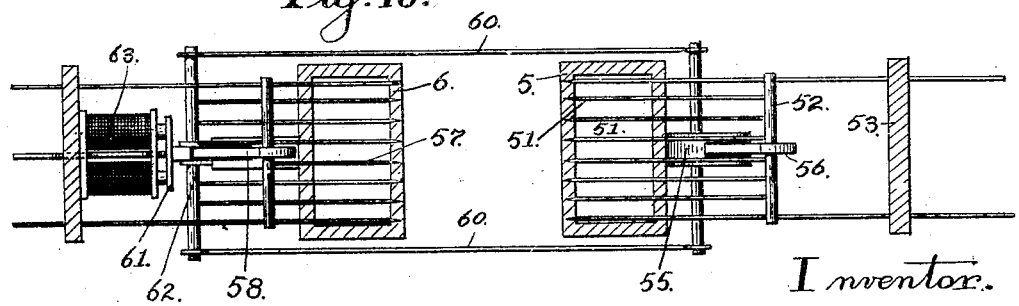
Witnesses:
Arthur L. Slee.
J. Compton
Inventor.
Cary S. Cox
by Wm. F. Booth
his Attorney.

UNITED STATES PATENT OFFICE.

CARY S. COX, OF FRESNO, CALIFORNIA, ASSIGNOR OF THREE-FIFTHS TO J. B. INDERRIEDEN CO., OF CHICAGO, ILLINOIS, A CORPORATION OF ILLINOIS.

FRUIT WEIGHING AND PACKING MACHINE.

No. 824,412.

Specification of Letters Patent.

Patented June 26, 1906.

Application filed October 3, 1905. Serial No. 281,147.

*To all whom it may concern:*

Be it known that I, CARY S. COX, a citizen of the United States, residing at Fresno, county of Fresno, State of California, have invented certain new and useful Improvements in Fruit Weighing and Packing Machines; and I hereby declare the following to be a full, clear, and exact description of the same.

My invention relates to the class of machines for weighing and packing material, especially fruit, and more particularly seeded raisins.

The objects of my invention are generally to increase the capacity of machines of this class, to render them automatic in many of their operations, to insure precise packing and weighing, and generally to adapt them to the varied necessities of the particular material to the packing and weighing of which they are applied.

Particular objects will be set forth during the course of the following description.

My invention consists in the novel combinations hereinafter fully described.

Referring to the accompanying drawings, Figure 1 is a vertical sectional elevation of my machine. Fig. 2 is a top view of the same, partly broken, and the supply or feed pipes being omitted. Fig. 3 is a top plan view, partly broken, of the machine, taken in a plane just below the filling-spouts and above the filling-funnels of the cartons. Fig. 4 is a detail end view of the carrier-controlling pawl-and-ratchet mechanism. Fig. 5 is a detail side view of the same. Fig. 6 is a top plan view, partly broken, taken in a plane below the upper table and above the lower carrier. Fig. 7 is a detail top view, enlarged, showing the means for dropping the filled carton, separating it from its filling-funnel, and suspending and discharging said funnel. Fig. 8 is a detail side view of the same. Fig. 9 is a detail side view, partly in section, of a main filling-spout and its complementary filling-spout, together with their controlling-gates and the carton-weighing means and gate-controlling devices. Fig. 10 is a horizontal cross-section through the spouts of Fig. 9 looking down.

1 is the base-plate, and 2 are posts rising therefrom. Secured to the top of the posts by radial arms 3 is the annular receiving-trough 4, from the bottom of which at intervals issue the main filling-spouts 5 and the complementary filling-spouts 6. Of these spouts there may be any number, though in practice four of each will be found sufficient, this number being herein indicated, as will be seen in Fig. 2. Relatively to each other the main spouts are best disposed at equidistant points, a like disposition being made of the complementary spouts. The arrangement of one order of spouts to the other is in pairs, as seen in Figs. 2, 9, and 10—that is to say, a main spout 5 is followed in relatively close juxtaposition by a complementary spout 6.

Referring to Fig. 1, a vertical shaft 7 is suitably mounted in the base-plate 1 and is rotated by means of a pinion 8 on its upper end, which engages with a pinion 9 upon a drive-shaft 10, mounted in bearings 11, rising from the arms 3. The pulleys 12 and 12' on the shaft 10 receive the belt for operating the machine.

13 is a plate fixed by its hub to the vertical shaft 7 and rotating with said shaft. The rim 14 of this plate bends over the inner wall of the annular trough 4 and has fixed to it a number of scraper-blades 15, as seen in Figs. 1 and 2, said blades traveling over the trough-bottom and traversing substantially its width.

In Figs. 1 and 2, 16 represents pipes which are to extend from some suitable source of moisture, either of water or steam. These pipes enter the trough 4 and open out just above the level of the scraper-blades 15. A moisture-applying substance, such as a wick or other absorbent 17, as indicated in Fig. 1, may be fitted to the end of the pipes 16, which substance by wiping contact with the passing blades will supply them with the moisture necessary to keep them from gumming when working in sticky fruit—such, for example, as seeded raisins.

18 in Fig. 1 represents any suitable delivery or feed pipes leading from a hopper. (Not shown.) There are four of these pipes, one for each main filling-spout 5, directly over which they open out and into which they are adapted to deliver the fruit directly.

Secured to the posts 2 by arms 19 is a fixed table 20, near the outer edge of which is formed an annular track 21, in the bottom of which are made holes 22, four in number, as seen in Fig. 3, in vertical alinement with the complementary feed-spouts 6 above, as shown in Figs. 1 and 9. Other holes 23, which from their function may be termed "drop-holes," are made in the bottom of the track 21, which holes 23, as seen in Figs. 3, 7, and 8, follow and are in close proximity to the holes 22—that is, each hole 22 is immediately followed by a hole 23. The latter holes open radially through the rim of the table, as seen in Fig. 3—that is, they are really deep indentations in said rim. Under the table 20 is a ledge 24, Fig. 1, upon which are the weighing-scales 25. There are four such scales in the present machine, one for each hole 22. The platform 26 of the weighing-scales lies in the hole 22 normally flush with the track 21. The beam 27 of each scale carries at its extremity electrical contacts 28 for closing certain circuits to be presently described. On the under side of the table 20 below the holes 23, as seen in Fig. 8, is a receiver 29 with a discharge-hole 30 in its bottom. The receiver has an outwardly-inclining back wall 31, Figs. 7, 8, and 3, which terminates in the vertical plane of the rim of the table 20. The function of this inclined wall is that of a discharging-cam for the filling-funnels, as will be presently seen.

32 is a carrier-plate. As seen in Fig. 1, it is mounted freely by its hub 33 around the vertical shaft 7, so that it may turn about said shaft as a center, but is not rotated by the shaft. It is supported by its hub 33 resting upon the table 20. The rim of the carrier is provided with a series of indentations 34, Figs. 1 and 3, which form what may be termed the "carton-sockets," said sockets being in vertical alinement with the track 21 of the underlying table 20. Upon the carrier-plate 32 is an inner annular ratchet 35 and an outer annular ratchet 36, the two being concentric, as seen in Fig. 3. The inner ratchet may be termed the "actuating-ratchet" and the outer the "retaining-ratchet," as such are their functions. Fixed upon the vertical shaft 7 by its hub 37 is the annular driving-ratchet 38.

Mounted in brackets 39, depending from the body-plate of the receiving-trough 4, Figs. 1, 4, and 5, is a rock-shaft 40, upon which is slidably mounted an actuating-pawl 41, controlled by a spring 42. This pawl, as shown particularly in Figs. 3 and 4, engages both the ratchets 35 and 38. The teeth of these ratchets, as shown in Fig. 3, are relatively oppositely disposed, so that the pawl 41 is caught between the opposing tooth-faces of the two ratchets. The shaft 40, upon which the pawl 41 is slidably mounted, is, as shown in Fig. 3, mounted in a line parallel to a tangent to the circles of the ratchets, with the result that when said pawl is caused to travel by its engagement with the driving-ratchet 38 it will for a brief period, by reason of its engagement with the ratchet 35, cause said ratchet to turn, and thereby will turn the carrier-plate 32, and will then withdraw from its engagement with said driving-ratchet, whereupon the carrier-plate will come to rest, while the pawl freed from the clamping effect of the opposing ratchet-teeth will by the superior weight of the parts on the other side of its pivotal center rise out of all engagement and under the influence of the spring 42 will return to its initial position for a repetition of its function of imparting a step-by-step or intermittent movement to the carrier-plate 32. The parts the weight of which thus lifts the actuating-pawl 41 comprise the armature 43, secured to the rock-shaft 40, and the retaining-pawl 44, also secured to said shaft, but not slidably. The function of the armature 43 will be presently described; but that of the retaining-pawl 44 is such as attaches to such pawls—namely, a timely engagement with and disengagement from the outer ratchet 36 to permit and to control with precision the movement of the carrier-plate 32, all as indicated in Figs. 1, 4, and 5.

Supported by arms 45 from the posts 2 is a fixed lower table 46, Figs. 1 and 6. Above this table and secured to and rotating with the shaft 7 is a second or lower carrier 47, which at its rim is provided with a receiving-track 48, in which, as seen in Fig. 6, is a number of holes 49. The track 48 is vertically alined with the drop-holes 23 in the track 21 of the table 20 above. In the lower table 46 at one or more places (shown as at one place in Figs. 1 and 6) is a discharge-spout 50, which may lead to any suitable subsequent apparatus—such, for example, as a carton-buttoner.

Referring now to Figs. 9 and 10, the means for automatically delivering and controlling the fruit charge and for controlling the intermittent movement of the carrier-plate 32 will be described. Operating in each of the main filling-spouts 5 is an upper gate 51, consisting of a series of sharp-pointed parallel wires connected by a cross-head 52 and guided by a bracket 53, depending from the body-plate of the receiving-trough 4. The wires of this gate play through and traverse the spout 5. A second or lower similar gate 54 operates in the lower portion of the spout. The two gates 51 and 54 are given relatively opposite movements by the connection with both of a lever 56, pivoted to a bracket 55.

In the complementary filling-spout 6 is mounted a similar gate 57, to which a reciprocating movement is imparted by a pivoted lever 58, controlled by a spring 59. The other end of this lever is connected by a rod 60 with the lower end of the lever 56.

The lever 58 is operated by an armature 61, connected with it by a link 62, said armature being controlled by an electromagnet 63 in a battery-circuit 64 with contacts 65 opposing the contacts 28 of the scale-beam 27. In the present machine there are four circuits 64, one for operating the controlling-gates of each pair of filling-spouts. In addition to these circuits there is a fifth or what might be termed a "general" circuit 66, (seen in Fig. 3,) which is controlled by all the scale-beams at the contacts 66', Fig. 9, and includes the electromagnet 67, Figs. 1, 4, and 5, adapted to operate the armature 43 of the rock-shaft 40, which carries the pawls 41 and 44.

68 represents the cartons to be filled, and 69 represents the top flaps thereof, which when buttoned close the package. 70 represents the filling-funnels for the cartons, each funnel having near its top the side lugs 71 for suddenly arresting and suspending it when dropped.

The operation of the machine is as follows, the description being with relation to the packing and weighing of one-pound cartons of seeded raisins: Attendants are constantly enveloping the filling-funnels 70 with waxed wrapping-paper, inserting said funnels so enveloped within the cartons, and seating said cartons in the carrier-sockets 34 of the carrier-plate 32, the cartons resting in the track 21 of the table 20. A description of what takes place at one of the four stations of the machine will suffice for the others. The raisins supplied through the delivery-pipe 18 drop directly into the underlying main filling-spout 5, and if the controlling-gates of said spout be in the position shown in Fig. 9 the raisins will rest upon the lower gate 54 and fill or more than fill the spout. Suppose now that said lower gate be withdrawn and by the same operation the upper gate 51 be projected. It is obvious that a charge of raisins equal in bulk to the capacity of the spout between the two gates will be discharged from said spout. This capacity in practice is, say, about twelve ounces. These twelve ounces are delivered into the underlying filling-funnel 70, Fig. 9, and pass down into that portion of the funnel within the carton. Let us now suppose the carrier-plate 32 to be advanced one step in the direction of the arrow in Fig. 9, so that the partly-supplied carton is carried along to and rests upon the scale-platform 26, interposed in the track 21 directly under the complementary spout 6, while the following carton is advanced to position under the main spout 5. The excess of raisins fed to spout 5 and which overflows its upper end and spreads into the receiving-trough 4 is pushed along by one of the continuously-rotating scraper-blades 15 and advanced to the complementary spout 6, into which it falls. The gate 57 of said spout is at the moment of the arrival thereunder of the first partially-filled carton withdrawn, so that said overflow or excess of raisins drops through the spout into the funnel and completes the full weight of sixteen ounces in the carton. At the same time the second carton is receiving its partial content of twelve ounces. As soon as the first carton has its full pound weight it depresses the scale-platform 26, which movement throws the scale-beam 27 up to cause its contacts 28 to electrically connect with the contacts 65, whereby the circuit 64 is closed. Thereupon the magnet 63 attracts the armature 61, which movement through the connected levers 58 and 56 reverses all the gates—that is to say, the gate 57 of the complementary spout 6 is projected to close the spout and cut off the feed of raisins to the now filled carton, the upper gate 51 of the main spout 5 is closed to cut off the feed and define the partial charge in said spout, while the lower gate 54 is opened to drop said partial charge into the second funnel and carton. This partial filling and subsequent completion by the scraping forward in the trough 4 of the overflow or excess goes on at each station or pair of spouts. Now as this overflow or excess which is needed to complete the weight is necessarily of varied amount at each station and as the action of the scraper-blades may not be exactly uniform it is essential that the period of rest of the carton-carrier plate 32 be prolonged until each of the four cartons on the scales shall have received its exact pound. This is the object of the fifth or general circuit 66.

Although one of the gate-circuits 64 may be closed by the reason of the carton applicable to it being full weight, the other three circuits 64 may not be closed, owing to the fact that their cartons are not yet full. Consequently the general circuit 66 remains open and the pawls and ratchets controlled by it are inactive, thereby allowing the carrier-plate to remain at rest. This continues until the last of the four circuits 64, or, in other words, all the four circuits 64, are closed by their full-weight cartons. Then the general circuit 66 is closed too, because all the scale-beams are lifted, and the effect is as follows: The magnet 67 lifts the armature 43 and rocks the shaft 40. This movement of the shaft lifts the retaining-pawl 44 from its ratchet 36 and throws the actuating-pawl 41 down to its joint engagement with the ratchets 35 and 38. As the ratchet 38 is continuously revolving, being on the shaft 7, it forces the pawl 41 forward, and this movement of the pawl carries the ratchet 35 forward, thereby turning the carrier-plate 32 and advancing the cartons one step. This advance carries the filled carton forward off the scale-platform, which latter immediately rises to its normal level just as the following partially-filled carton reaches and passes upon it. The return or rising movement of the scale-platform causes the scale-beam to drop and to open the circuit 64. Thereupon the spring 59 shifts the gates for a repetition of the operation. At the same time, as heretofore described, the actuating-pawl 41, traveling in a straight line on the rock-shaft 40, is forced to leave its engagement with the driving-ratchet 38. Thereupon, freed of the binding effect of the two ratchets 35 and 38, the weight of the armature 43 (which is now released from the magnet 67 by the opening of the general circuit 66, due to the opening of the circuit 64) and the weight of the retaining-pawl 44 cause the shaft 40 to raise the actuating-pawl 41 clear of the ratchet 35, and said pawl returns to its initial position under the force of the spring 42. The carrier-plate 32 now stops and is held precisely by the retaining-pawl 44 engaging the ratchet 36. The filled carton, advanced from the scale-platform, as described, reaching the indented hole 23 in the table 20, drops, together with its filling-funnel, into said hole. The descent of the two continues until the side lugs 71 of the filling-funnel come in contact with the carrier, and by bridging the socket 34 thereof, as shown in Fig. 8, arrest the descent of the funnel with a suddenness sufficient to jar the carton from it. The carton thus freed continues its descent, and passing through the hole 30 in the bottom of the receiver 29 drops down into and partly through the hole 49 in the track 48 of the lower carrier 47 and rests upon the lower table 46, as seen on the left in Fig. 1. In this drop as it brings up against the table its contents are well packed down by the force of the blow. By the carrier 47 it is carried around on the table until it reaches the discharge-spout 50, through which it drops, as shown on the right in Fig. 1. The filling carton, moved around by the carrier-plate 32, in the sockets 34 of which it is suspended, is carried into contact with the inclined wall 31 of the receiver 29, by which wall, as seen in Figs. 7 and 8, it is gradually forced out from the socket 34 and the indented hole 23 and finally is discharged clear of the machine to be picked up and reused by the attendant.

In working with as sticky fruit as seeded raisins it is essential that the scraper-blades 15 be kept wet. This is accomplished by the wicks 17, which supply them with enough moisture to prevent them from gumming.

Having thus described my invention, what I claim as new, and desire to secure by Letters Patent, is—

1. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, means for transferring to said complementary spout the excess of material supplied to the main spout, means for advancing the carton from the main to the complementary spout, means for weighing the carton as it receives its complement of material, and means called into action by the weight of the filled carton for operating the controlling means of both spouts.

2. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, a traveling scraper traversing the entrances to both spouts and adapted to transfer to the complementary spout the excess of material supplied to the main spout, means for advancing the carton from the main to the complementary spout, means for weighing the carton as it receives its complement of material, and means called into action by the weight of the filled carton for operating the controlling means of both spouts.

3. In a weighing and packing machine, the combination of a main filling-spout, controlling means in connection therewith, to define and deliver a partial charge to the carton, means for supplying the material to said spout, a complementary filling-spout following the main spout, a controlling means in said complementary spout, means for transferring to said complementary spout the excess of material supplied to the main spout, means for advancing the carton from the main to the complementary spout, means for weighing the carton as it receives its complement of material, and means called into action by the weight of the filled carton for operating the controlling means of both spouts consisting of an electric circuit controlled by the weighing means, an electromagnet in said circuit, an armature, and connections from said armature to said spout-controlling means.

4. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, a traveling scraper traversing the entrances to both spouts and adapted to transfer to the complementary spout the excess of material supplied to the main spout, means for advancing the carton from the main to the complementary spout, means for weighing the carton as it receives its complement of material, and means called into action by the weight of the filled carton for operating the controlling means of both spouts, consisting of an electric circuit controlled by the weighing means, an electromagnet in said circuit, an armature, and connections from said armature to said spout-controlling means.

5. In a weighing and packing machine, the combination of a filling-spout, a charge-controlling means in connection therewith, means for carrying the carton under said spout, means for weighing it as it receives its charge, and means called into action by the weight of the charged carton for operating both the spout-controlling means, and the carton-carrying means, consisting of an electric circuit controlled by the weighing means, an electromagnet in said circuit, an armature, and connections from said armature to the spout-controlling means, a second electric circuit controlled by the weighing means, an electromagnet in said second circuit, an armature, and a pawl-and-ratchet driving mechanism controlled by said armature.

6. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, means for transferring to said complementary spout the excess of material supplied to the main spout, means for advancing the carton from the main to the complementary spout, means for weighing the carton as it receives its complement of material, and means called into action by the weight of the filled carton for operating the controlling means of both spouts, and for operating the carton-advancing means.

7. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, a traveling scraper traversing the entrances to both spouts and adapted to transfer to the complementary spout the excess of material supplied to the main spout, means for advancing the carton from the main to the complementary spout, means for weighing the carton as it receives its complement of material, and means called into action by the weight of the filled carton for operating the controlling means of both spouts and for operating the carton-advancing means.

8. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, means for transferring to said complementary spout the excess of material supplied to the main spout, means for advancing the carton from the main to the complementary spout, means for weighing the carton as it receives its complement of material, and means called into action by the weight of the filled carton for operating the controlling means of both spouts, and for operating the carton-advancing means consisting of an electric circuit controlled by the weighing means, an electromagnet in said circuit, an armature, and connections from said armature to the spout-controlling means, a second electric circuit controlled by the weighing means, an electromagnet in said second circuit, an armature, and a pawl-and-ratchet driving mechanism controlled by said armature.

9. In a weighing and packing machine, the combination of a main filling-spout, controlling means in connection therewith to define and deliver a partial charge to the carton, means for supplying the material to said spout, a complementary filling-spout following the main spout, a controlling means in said complementary spout, a traveling scraper traversing the entrances to both spouts and adapted to transfer to the complementary spout the excess of material supplied to the main spout, means for advancing the carton from the main to the complementary spout, means for weighing the carton as it receives its complement of material, and means called into action by the weight of the filled carton for operating the controlling means of both spouts and for operating the carton-advancing means, consisting of an electric circuit controlled by the weighing means, an electromagnet in said circuit, an armature, and connections from said armature to the spout-controlling means, a second electric circuit controlled by the weighing means, an electromagnet in said second circuit, an armature, and a pawl-and-ratchet driving mechanism controlled by said armature.

10. In a weighing and packing machine, the combination of a plurality of filling-spouts, charge-controlling means in connection with each spout, means for advancing a carton under each spout simultaneously, means for weighing each carton under its own spout, means called into action separately by the weight of the filled cartons for operating the controlling means of each spout, and other means called into action only upon the joint operation of all the separate weight-controlled means for effecting the operation of the carton-advancing means.

11. In a weighing and packing machine, the combination of a plurality of filling-spouts, charge-controlling means in connection with each spout, means for advancing a carton under each spout simultaneously, means for weighing each carton under its own spout, a plurality of electric circuits, each controlled by one of the weighing means, an electromagnet in each circuit, an armature for each magnet and connections from said armature to the spout-controlling means, and a general electric circuit controlled by the joint operation of all the weighing means, an electromagnet in said general circuit, an armature for said magnet, and a pawl-and-ratchet driving mechanism controlled by said armature, for operating the carton-advancing means.

12. In a weighing and packing machine, the combination of a plurality of main filling-spouts, a charge-controlling means for each main spout, means for supplying the material to each of said main spouts, a plurality of complementary spouts, a controlling means for each of said last-named spouts, means for transferring to each of said complementary spouts the excess of material supplied to its main spout, means for advancing the cartons under each main spout, and its complementary spout successively, means for weighing each carton under its complementary spout, means called into action separately by the weight of the filled cartons for operating the controlling means of all the spouts, and means called into action only upon the joint operation of all the separate weight-controlled means, for effecting the operation of the carton-advancing means.

13. In a weighing and packing machine, the combination of a plurality of main filling-spouts, a charge-controlling means for each main spout, means for supplying the material to each of said main spouts, a plurality of complementary spouts, a controlling means for each of said last-named spouts, means for transferring to each of said complementary spouts the excess of material supplied to its main spout, means for advancing the cartons under each main spout, and its complementary spout successively, means for weighing each carton under its complementary spout, a plurality of electric circuits, each controlled by one of the weighing means, an electromagnet in each circuit, an armature for each magnet and connections from said armatures to the spout-controlling means, and a general electric circuit controlled by the joint operation of all the weighing means, an electromagnet in said general circuit, an armature for said magnet and a pawl-and-ratchet driving mechanism controlled by said armature, for operating the carton-advancing means.

14. In a weighing and packing machine, the combination of a rotatable carrier to advance the cartons to be filled, means for filling said cartons, a continuously-rotating annular ratchet, an annular ratchet on the carrier concentric with the continuously-rotating ratchet, and having teeth directed oppositely to the teeth of said rotating ratchet, an actuating-pawl, mounted to slide in a line parallel to a tangent to said ratchets and adapted to traverse the teeth of both ratchets, whereby it is bound between them, and by its lineal travel withdraws from its engagement, and means called into action by the weight of the filled cartons for controlling said actuating-pawl.

15. In a weighing and packing machine, the combination of a rotatable carrier to advance the cartons to be filled, means for filling said cartons, a continuously-rotating annular ratchet, an annular ratchet on the carrier concentric with the continuously-rotating ratchet, and having teeth directed oppositely to the teeth of said rotating ratchet, an actuating-pawl, mounted to slide in a line parallel to a tangent to said ratchets and adapted to traverse the teeth of both ratchets, whereby it is bound between them, and by its lineal travel withdraws from its engagement, means called into action by the weight of the filled cartons for controlling said actuating-pawl, a retaining-ratchet on said rotatable carrier, and a retaining-pawl controlled in its engagement with the retaining-ratchet by the means controlling the actuating-pawl.

16. In a weighing and packing machine, the combination of a main filling-spout, a complementary filling-spout following the main spout, means for supplying the material to the main spout, a traveling scraper traversing the entrances to both spouts, and adapted to transfer to the complementary spout the excess of material supplied to the main spout, and means for applying moisture to said traveling scraper.

17. In a weighing and packing machine, means for advancing the carton and its independent filling-funnel fitted thereto, means for dropping them when the carton is filled, and means for suddenly arresting the falling filling-funnel, whereby the carton is jarred free of the funnel.

18. In a weighing and packing machine, a table upon which the carton with its filling-funnel is supported, said table having a drop-hole in the path of travel of the carton, a carrier engaging the carton to advance it, whereby it drops when it reaches the hole in the table, and means on the filling-funnel for arresting said funnel in its fall, and suspending it from the carrier, whereby the filled carton is jarred free of the suspended funnel.

19. In a weighing and packing machine, a table upon which the carton with its filling-funnel is supported, said table having a drop-hole in the path of travel of the carton, a carrier engaging the carton to advance it, whereby it drops when it reaches the hole in the table, means on the filling-funnel for arresting said funnel in its fall, and suspending it from the carrier, whereby the filled carton is jarred free of the suspended funnel, and a means on the table engaged by the advancing suspended funnel for freeing said funnel from its supports.

20. In a weighing and packing machine, a table upon which the carton with its filling-funnel is supported, said table having a drop-hole in the path of travel of the carton, a carrier engaging the carton to advance it, whereby it drops when it reaches the hole in the table, means on the filling-funnel for arresting said funnel in its fall, and suspending it from the carrier, whereby the filled carton is jarred free of the suspended funnel, means on the table engaged by the advancing suspended funnel for freeing said funnel from its supports, an underlying table to receive the falling carton, and a rotating carrier to convey it to its destination.

In witness whereof I have hereunto set my hand.

CARY S. COX.

Witnesses:
J. COMPTON,
D. B. RICHARDS.